United States Patent [19]

Engel

[11] 4,120,119

[45] Oct. 17, 1978

[54] ELBOW PLANTER BOX

[75] Inventor: Hugo George Engel, Somerville, N.J.

[73] Assignee: Superior Tool & Manufacturing Company, Somerville, N.J.

[21] Appl. No.: 709,769

[22] Filed: Jul. 29, 1976

[51] Int. Cl.² .................................. A01G 9/02
[52] U.S. Cl. ............................... 47/66; 47/68; 47/86; 220/4 C; 220/4 F
[58] Field of Search ............ 220/4 R, 4 A, 4 C, 4 D, 220/4 F, 8, DIG. 25, 3.94; 217/13; 119/61; 47/33, 66, 68, 86; 46/25, 26; 61/14, 15

[56] References Cited

U.S. PATENT DOCUMENTS

| 497,466 | 5/1893 | Davidson | 61/15 |
|---|---|---|---|
| 876,235 | 1/1908 | Quackenboss | 220/8 X |
| 1,205,302 | 11/1916 | Williams | 61/15 |
| 1,373,883 | 4/1921 | Gray | 61/15 |
| 1,513,673 | 10/1924 | Pearson | 61/14 |
| 2,383,938 | 9/1945 | MacKenzie | 61/14 |
| 2,799,424 | 7/1957 | Good | 220/8 |
| 3,302,949 | 2/1967 | Wolfe | 47/68 X |
| 3,664,071 | 5/1972 | Gallagher | 61/15 X |
| 3,696,960 | 10/1972 | Smirle | 220/4 F |

FOREIGN PATENT DOCUMENTS

| 24,544 | 9/1935 | Australia | 61/15 |
|---|---|---|---|
| 616,614 | 3/1961 | Canada | 119/61 |
| 1,204,010 | 10/1965 | Fed. Rep. of Germany | 119/61 |
| 257,501 | 6/1912 | Fed. Rep. of Germany | 47/68 |
| 2,289,110 | 5/1976 | France | 47/68 |
| 537,147 | 6/1941 | United Kingdom | 47/66 |

Primary Examiner—Edgar S. Burr
Assistant Examiner—Steven A. Bratlie
Attorney, Agent, or Firm—Kenneth Watov

[57] ABSTRACT

Reduced ends of an elbow-like receptacle form flanges for rigid connection to the inside surfaces proximate individual open ends of two trough-like receptacles, for connecting these trough-like receptacles together at an angle, forming a continuous planter or flower box. Provision for extending the length of a section of the planter is also included via a splicer, having a plate with a flange, for rigid connection to the inside surfaces proximate individual open ends of two trough-like receptacles, respectively, abutted together.

7 Claims, 5 Drawing Figures

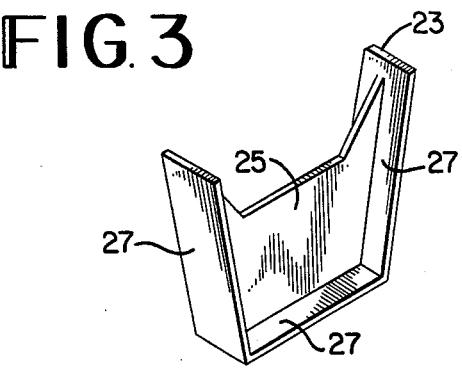
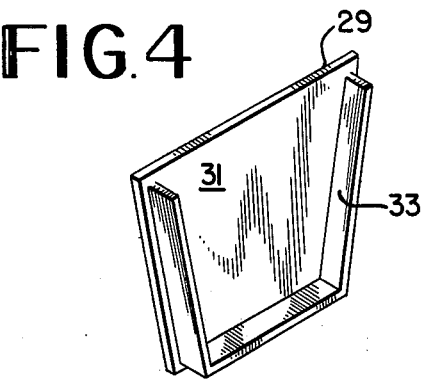
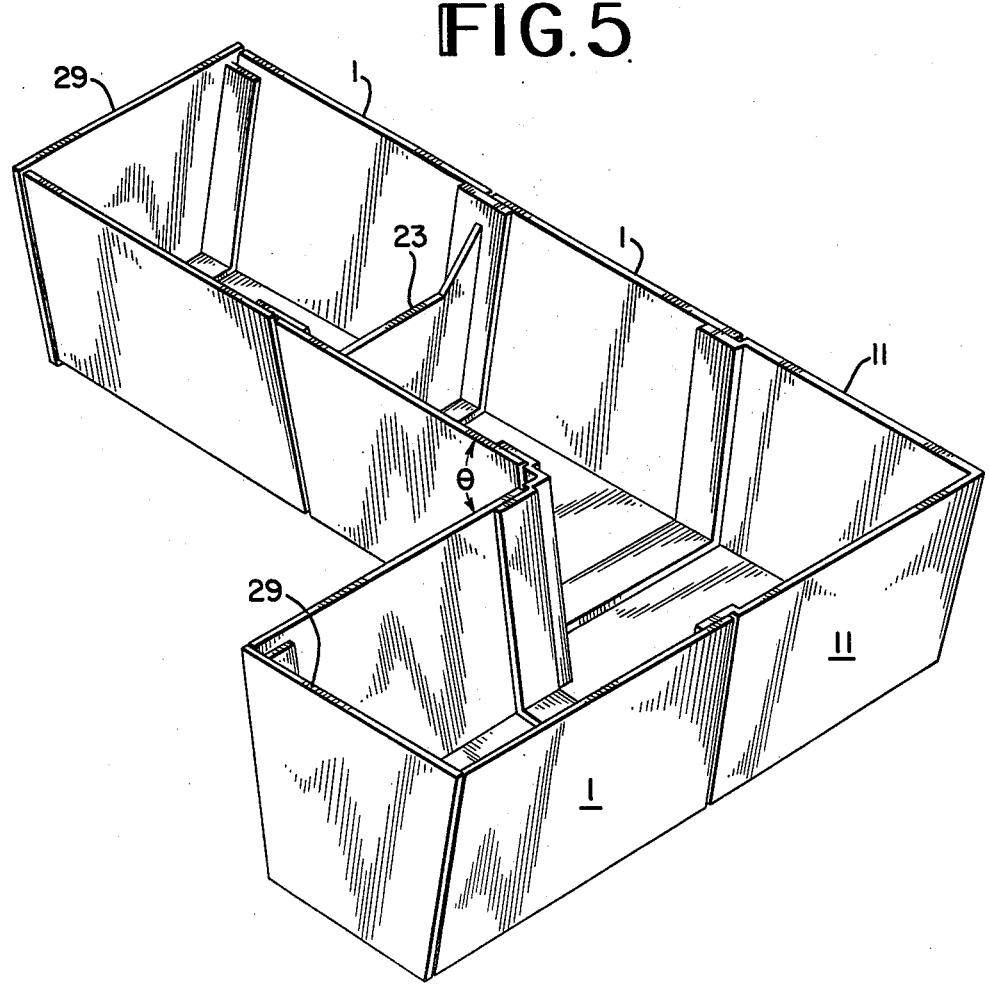

ELBOW PLANTER BOX

BACKGROUND OF THE INVENTION

This invention relates generally to planter or flower boxes, and more specifically to planters including one adapter for interconnecting two planter boxes together at an angle, and another adapter for connecting two planter boxes in abutting end to end relationship.

Adjustable length flower boxes may include interslideable sections, such as disclosed in Quackenboss U.S. Pat. Nos. 876,235, and Martin 2,223,074. Haile Patent 3,389,499 teaches the use of blocks having a laterally projecting locking lug at one end, and a lug receiving recess at another end, whereby the lugs of one block lock into the recess of another block. In this manner, individual blocks can be locked together. Haile alos teaches the use of a "corner block" having receiving recesses cut into the top edges of two sides at right angles to one another, for mating with the lugs of two other straight blocks, respectively. In this manner, the straight blocks are coupled via the corner block at right angles to one-another. Hurst U.S. Pat. No. 1,293,785 teaches the use of a tongue and groove on two boxes, respectively, for interconnecting the boxes together.

None of these boxes provide an adapter or means for connecting any two boxes together at a given angle, while providing a continuous box. Nor do these boxes provide an adapter or means for abutting the edges of open ends of two boxes directly and rigidly together, for forming a longer box.

SUMMARY OF THE INVENTION

It is therefore an object of this invention to provide an improved planter box.

It is another object of this invention to provide a splicer means for joining planter boxes together, with ends directly abutting to form a longer and continuous planter box.

It is a more particular object to provide coupling means for connecting planter boxes together at a given angle, while forming a continuous planter box.

In accordance with these and other objects, there is provided a splicer for connecting any two box-like sections together with edges of ends abutted to form a continuous planter box, and an elbow-like coupler for coupling any two sections together a given angle to form a unitary continuous planter.

BRIEF DESCRIPTION OF THE DRAWINGS

Reference is made to the accompanying drawings for a more complete understanding of the subject invention and the manner in which the above-enumerated objects are accomplished, wherein like reference numbers refer to like parts throughout, and in which:

FIG. 3 is a perspective view of a splicer of the subject invention;

FIG. 4 is a perspective view of an end cap; and

FIG. 5 is a perspective view of an example of one planter box of the subject invention, including three sections connected into a continuous unit via a splicer and an angular coupling.

DETAILED DESCRIPTION OF THE PREFERRED EMBODIMENT

Figure 1:
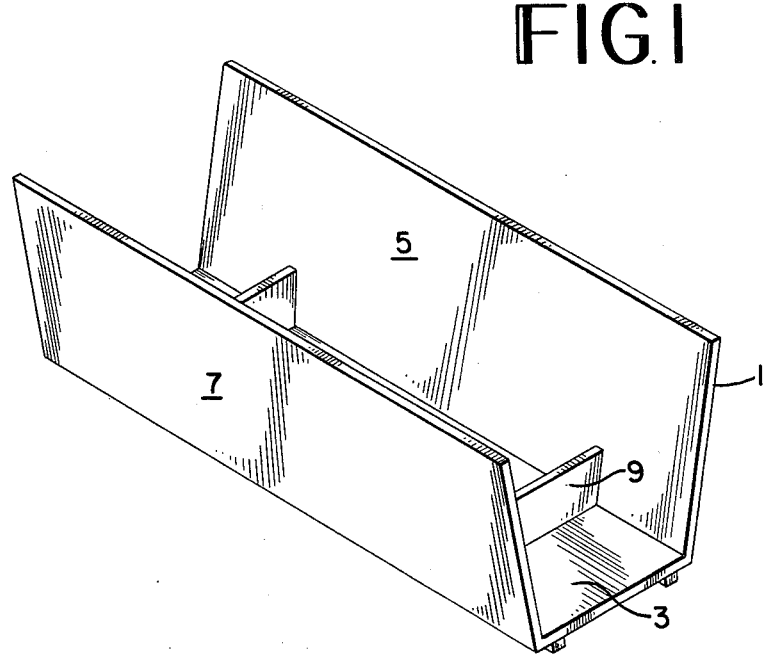
FIG. 1 is a perspective view of a planter box section.

In FIG. 1, a trough-like box 1 includes a bottom 3, two opposing sides 5 and 7, and one or more stiffening ribs 9 (if necessary for increased strength). As shown, the box 1 has open ends, and is typical of a major section of the subject planter box. Of course, the ends of the box 1 could be capped, if one such section was required as a planter box.

Figure 2:
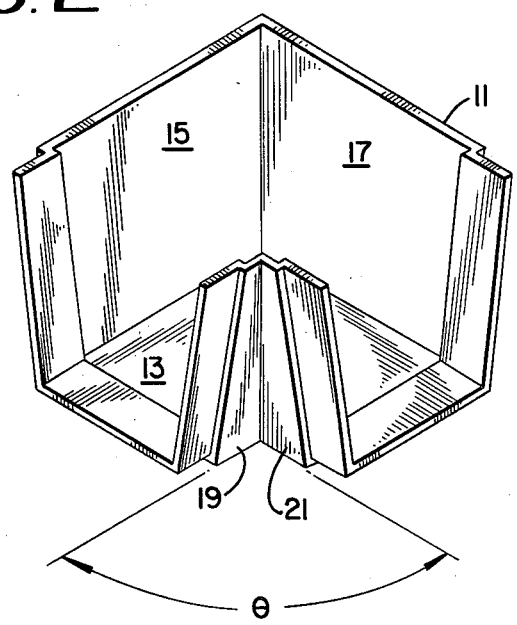
FIG. 2 is a perspective view of an angular coupler of the present invention.

In FIG. 2, an angular coupler 11 (forming an elbow-like receptacle), includes a bottom 13, a first pair of sides 15, 17 having lowermost portions rigidly joined to the bottom 13 and individual ends to one-another at an angle $\theta$, and a second pair of sides 19, 21 having lowermost portions rigidly joined to the bottom 13 and individual ends to one-another at some angle $\theta$ ($\theta$ can be any desired angle). A flange is formed at each open end of the coupler or elbow 11 by reduced portions of bottom 13 and sides 15, 19 at one end, and by similarly reduced portions of bottom 13 and sides 17, 21 at the other end. Opposing sides 15, 19 and 17, 21 are mounted to the bottom 13 in such manner that their unreduced opposing portions form trough-like cross-sections substantially of the same dimension as the cross-section of box 1. The flanges at the open ends of the coupler 11 are dimensioned to fit snugly within and against the inside surfaces proximate of an open end of a major section or trough-like box 1, for rigid attachment thereto by suitable means such as glue, screws, and so forth. As shown, the open ends of the coupler are at the angle $\theta$ to one another.

In FIG. 3, a splicer 23 includes a stiffener plate 25 having a flange 27 rigidly attached to (or formed with the plate 25 in one piece in the case of plastic molded material) the side and bottom edges of plate 25. The stiffener plate 25 with flange 27 are dimensioned to fit across the width of and snugly against the inside surfaces proximate the open ends of two major sections 1 abutted together, for rigid attachment thereto by suitable means. As shown, equal portions of the width of the flange 27 are located on either side of the stiffener plate 25.

In FIG. 4, an end cap 29 includes a wall-like member 31 having a flange 33 projecting outward from its bottom and side edges. The end cap 29 is dimensioned to ensure its flange 33 fits snugly across the width of and against the inside surface of an open end of a major section 1, for rigid attachment thereto by suitable means.

An example of how three major sections can be interconnected to form a continuous planter box; is shown in FIG. 5. As shown, two major sections 1 are rigidly interconnected at abutted respective open ends by a splicer 23, forming an elongated section. An angular coupler 11 is used to rigidly couple another major section 1 at an angle $\theta$ to the centrally located major section 1. End caps 29 are used to close off the open ends of the upper and lowermost major sections 1. Obviously, an unlimited combination of major sections 1, splicers 23, angular couplers or elbows 11, can be used to provide a desired continuous planter box.

The material used for fabricating the planter box can be any one of a number of suitable materials. Wood, plastic, aluminum, stainless steel, and so forth, are examples. Plastic material is ideal in that the components of the planter box are capable of being formed each in one piece from plastic by a molding process. Also, it is desirable that any major section 1 be capable of being sawed or otherwise cut across its width to a desired length. Straight sections of various desired lengths can be obtained via the combination of major sections 1 joined by splicers 23, and shortening of a standard length major section 1 by cutting, if necessary.

Although the planter box, as described, has a trough-like shape or cross-section, any desired shape suitable can clearly be used. For example, the cross-section or shape of the planter box can be made square, rectangular, and so forth.

What is claimed is:

1. In a planter box adapted for containing plants, the combination comprising:
    at least two box-like receptacles each having a bottom, opposing sides, an open top, and at least one open end;
    an elbow-like receptacle having an open top, a bottom, two pairs of opposing sides, and two open reduced ends forming flanges and offset from one another at a given angle greater than zero and less than 180°, said flanges each being dimensioned for snugly fitting within and being rigidly attached to the sides and bottom of an open end of two individual ones of said box-like receptacles, respectively, thereby connecting said receptacles together at said given angle; and end cap means for selectively closing any open ends of said box-like receptacles, and means for connecting said receptacles so that the outside surfaces of said planter box between the end caps have substantially no discontinuities except for those at the bend of the elbow-like receptacle.

2. The planter box of claim 1 further including splicer means connected between individual open ends of each one of two of said boxes where at least 3 of said box-like receptacles are included in said planter box, for rigidly connecting said box-like receptacles together to extend the length of said planter box.

3. The planter box of claim 2, wherein said splicer means includes:
    a stiffener plate having a flange around its side and bottom edges, dimensioned to fit snugly across the width of and within any one of said plurality of box-like receptacles, said plate being positioned so that its flange bridges the inside surfaces of the bottoms, and sides of an open end of each one of two of said box-like receptacles substantially abutted together.

4. A planter box adapted for containing plants, comprising:
    a plurality of trough-like boxes each having a bottom, a pair of opposing side sections, and a pair of opposing open ends;
    internal splicer means for bridgeably and rigidly interconnecting along their widths, the sides and bottoms of at least two of said trough-like boxes at their adjacent open ends and substantially partitioning said trough-like boxes, for extending the length of said planter box;
    box-like elbow means having two non-opposing reduced open ends receivable inside the open ends of two of said trough-like boxes which are at any given angle greater than zero and less than 180° from one-another, rigidly interfilled to and between an individual open end of each one of two of said trough-like boxes, respectively, for coupling said trough-like boxes together at said given angle therebetween, while forming therewith a continuous planter box; and
    end cap means for selectively closing off any open ends of said plurality of trough-like boxes said planter box having substantially no discontinuities between outside surfaces.

5. The planter box of claim 4, wherein said splicer means includes:
    a stiffener plate having a flange around its side and bottom edges, dimensioned to fit snugly across the width of and within any one of said plurality of trough-like boxes, said plate being positioned so that its flange bridges the inside surfaces of the bottoms, and sides of the open ends of two of said trough-like boxes substantially abutted together.

6. The planter box of claim 4, wherein said box-like elbow means includes:
    a box having a bottom, a first pair of sides joined along vertical edges at a given angle, a second pair of sides joined along vertical edges at said given angle, one of each of said first and second pairs of sides being opposed and forming with said bottom a first open end having a reduced flange, the other one of each of said first and second pairs of sides being opposed and forming with said bottom a second open end having a reduced flange, and at said given angle to said first open end, whereby said flanges of said first and second open ends fit snugly within the open ends of, and are rigidly attached to the inside surface of the sides and bottom of two of said plurality of trough-like boxes.

7. The planter box of claim 4, wherein said box-like elbow means includes:
    a receptacle having an open top, a bottom, two opposing sides, and two open reduced ends offset from one-another at said given angle, the dimensions of the unreduced portions of said open ends proximate said reduced ends, being substantially identical to the dimensions of the open ends of said plurality of trough-like boxes, the reduced ends of said box forming flanges for snugly fitting within and being rigidly attached to the sides and bottom of an open end of individual ones of two of said plurality of trough-like boxes, respectively.

* * * * *